United States Patent
Milne et al.

(10) Patent No.: US 11,347,832 B2
(45) Date of Patent: May 31, 2022

(54) HEAD RELATED TRANSFER FUNCTION (HRTF) AS BIOMETRIC AUTHENTICATION

(71) Applicant: Sony Corporation, Tokyo (JP)

(72) Inventors: James R. Milne, Ramona, CA (US); Gregory Carlsson, Santee, CA (US); Tonni Sandager Larsen, San Diego, CA (US)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 16/440,288

(22) Filed: Jun. 13, 2019

(65) Prior Publication Data
US 2020/0394288 A1  Dec. 17, 2020

(51) Int. Cl.
G06F 21/00 (2013.01)
G06F 21/32 (2013.01)
G06F 21/40 (2013.01)

(52) U.S. Cl.
CPC .............. *G06F 21/32* (2013.01); *G06F 21/40* (2013.01); *G06F 2221/2113* (2013.01); *G06F 2221/2141* (2013.01)

(58) Field of Classification Search
CPC .. G06F 21/32; G06F 21/40; G06F 2221/2141; G06F 2221/2113; H04L 9/3231; H04L 63/0861
See application file for complete search history.

(56) References Cited

U.S. PATENT DOCUMENTS

| | | | |
|---|---|---|---|
| 6,181,800 B1 | 1/2001 | Lambrecht | |
| 6,795,556 B1 | 9/2004 | Sibbald et al. | |
| 7,634,092 B2 | 12/2009 | McGrath | |
| 7,720,229 B2 | 5/2010 | Duraiswami et al. | |
| 7,840,019 B2 | 11/2010 | Slaney et al. | |
| 8,452,036 B2 | 5/2013 | Sommer et al. | |
| 8,489,371 B2 | 7/2013 | Guillon et al. | |
| 8,503,682 B2 | 8/2013 | Fukui et al. | |
| 8,520,857 B2 | 8/2013 | Fukui et al. | |
| 8,787,584 B2 | 7/2014 | Nyström et al. | |
| 9,030,545 B2 | 5/2015 | Pedersen | |
| 9,101,279 B2 | 8/2015 | Ritchey et al. | |

(Continued)

FOREIGN PATENT DOCUMENTS

| CN | 105027580 B | 5/2017 |
|---|---|---|
| CN | 107172566 B | 1/2019 |

(Continued)

OTHER PUBLICATIONS

Sonoda K., Takizawa O. (2008) User Authentication Scheme Using Individual Auditory Pop-Out. In: Tsihrintzis G.A., Virvou M., Howlett R.J., Jain L.C. (eds) New Directions in Intelligent Interactive Multimedia. Studies in Computational Intelligence, vol. 142. Springer, Berlin, Heidelberg. (Year: 2008).*

(Continued)

*Primary Examiner* — Alexander Lagor

(74) *Attorney, Agent, or Firm* — John L. Rogitz

(57) ABSTRACT

A head related transfer function (HRTF), which can be considered as biometric data is used to authenticate a user from whom the HRTF is derived. The HRTF may be used for authentication in combination with other biometric data such as retina scan or fingerprint to render two-factor biometric authentication. The HRTF used for authentication is encrypted for security.

19 Claims, 7 Drawing Sheets

(56) References Cited

U.S. PATENT DOCUMENTS

| | | |
|---|---|---|
| 9,118,488 B2 | 8/2015 | Donaldson |
| 9,118,991 B2 | 8/2015 | Nystrom et al. |
| 9,167,368 B2 | 10/2015 | Jong et al. |
| 9,448,405 B2 | 9/2016 | Yamamoto |
| 9,544,706 B1 | 1/2017 | Hirst |
| 9,591,427 B1 | 3/2017 | Lyren et al. |
| 9,740,305 B2 | 8/2017 | Kabasawa et al. |
| 9,848,273 B1 | 12/2017 | Helwani et al. |
| 9,854,362 B1 | 12/2017 | Milne et al. |
| 9,900,722 B2 | 2/2018 | Bilinski et al. |
| 9,924,289 B2 | 3/2018 | Trivi et al. |
| 9,992,602 B1 | 6/2018 | Allen |
| 10,003,905 B1 | 6/2018 | Milne et al. |
| 10,149,089 B1 | 12/2018 | Edry et al. |
| 10,154,365 B2 | 12/2018 | Silva |
| 10,206,055 B1 | 2/2019 | Mindlin et al. |
| 10,455,327 B2 | 10/2019 | Oswald et al. |
| 10,492,018 B1 | 11/2019 | Allen |
| 10,499,179 B1 * | 12/2019 | Lyren ............... G06T 13/205 |
| 2004/0091119 A1 | 5/2004 | Duraiswami et al. |
| 2006/0116930 A1 | 6/2006 | Goldstein |
| 2006/0282671 A1 * | 12/2006 | Burton ............... G16H 30/20 713/176 |
| 2011/0137437 A1 | 6/2011 | Jonsson |
| 2011/0314530 A1 * | 12/2011 | Donaldson ............ H04L 9/3271 726/7 |
| 2012/0014528 A1 | 1/2012 | Wang |
| 2012/0201405 A1 | 8/2012 | Slamka et al. |
| 2012/0213375 A1 * | 8/2012 | Mahabub ............... H04S 5/00 381/17 |
| 2013/0036452 A1 * | 2/2013 | Yamashita ............ G06F 21/32 726/3 |
| 2013/0154930 A1 | 6/2013 | Xiang et al. |
| 2013/0169779 A1 | 7/2013 | Pedersen |
| 2013/0170679 A1 | 7/2013 | Nystrom et al. |
| 2013/0177166 A1 | 7/2013 | Agevik et al. |
| 2013/0208899 A1 | 8/2013 | Vincent et al. |
| 2014/0171195 A1 | 6/2014 | Searchfield et al. |
| 2014/0185847 A1 | 7/2014 | Gran et al. |
| 2015/0010160 A1 | 1/2015 | Udesen |
| 2015/0063610 A1 | 3/2015 | Mossner |
| 2015/0106475 A1 | 4/2015 | Tan et al. |
| 2015/0256613 A1 | 9/2015 | Walker et al. |
| 2015/0293655 A1 | 10/2015 | Tan |
| 2015/0347735 A1 | 12/2015 | Yamashita |
| 2016/0080577 A1 | 3/2016 | Norris et al. |
| 2016/0100268 A1 | 4/2016 | Stein et al. |
| 2016/0124707 A1 | 5/2016 | Ermilov et al. |
| 2016/0142848 A1 | 5/2016 | Saltwell |
| 2016/0269849 A1 | 9/2016 | Riggs et al. |
| 2017/0078820 A1 | 3/2017 | Brandenburg et al. |
| 2017/0094440 A1 | 3/2017 | Brown et al. |
| 2017/0332186 A1 | 11/2017 | Riggs et al. |
| 2018/0091921 A1 | 3/2018 | Silva |
| 2018/0136898 A1 | 5/2018 | Shi et al. |
| 2018/0139565 A1 | 5/2018 | Norris et al. |
| 2018/0249276 A1 | 8/2018 | Godfrey |
| 2018/0310115 A1 | 10/2018 | Romigh |
| 2019/0007725 A1 | 1/2019 | Ferrer |
| 2019/0200159 A1 | 6/2019 | Park et al. |
| 2019/0215637 A1 | 7/2019 | Lee et al. |
| 2019/0289414 A1 * | 9/2019 | Lyren ............... H04S 5/00 |
| 2019/0295554 A1 * | 9/2019 | Lesso ............... G10L 17/22 |
| 2020/0045491 A1 | 2/2020 | Robinson et al. |
| 2020/0077222 A1 | 3/2020 | Nguyen et al. |
| 2020/0104620 A1 | 4/2020 | Cohen et al. |
| 2020/0107149 A1 | 4/2020 | Sunder et al. |
| 2020/0260199 A1 | 8/2020 | Burwinkel et al. |
| 2021/0185471 A1 | 6/2021 | Jot et al. |

FOREIGN PATENT DOCUMENTS

| | | |
|---|---|---|
| JP | 5285626 B2 | 9/2013 |
| JP | 2017092732 A | 5/2017 |
| KR | 20180051411 A | 5/2018 |
| WO | 2017116308 A1 | 7/2017 |
| WO | 2018110269 A1 | 6/2018 |
| WO | 2019059558 A1 | 3/2019 |

OTHER PUBLICATIONS

Sonoda, K., & Takizawa, O. (2008). User Authentication Scheme Using Individual Auditory Pop-Out. In New Directions in Intelligent Interactive Multimedia (pp. 341-349). Springer, Berlin, Heidelberg. (Year: 2008).*

T. Arakawa, T. Koshinaka, S. Yano, H. Irisawa, R. Miyahara and H. Imaoka, "Fast and accurate personal authentication using ear acoustics," 2016 Asia-Pacific Signal and Information Processing Association Annual Summit and Conference (APSIPA), 2016, pp. 1-4, doi: 10.1109/APSIPA.2016.7820886. (Year: 2016).*

Politis et al., "Applications of 3D spherical transforms to personalization of head-related transfer functions", 2016 IEEE International Conference on Acoustics, Speech and Signal Processing (ICASSP), Mar. 2016.

"Hear an Entirely New Dimension of Sound", OSSIC, Retrieved from https://www.ossic.com/3d-audio/.

Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).

Henrik Moller, "Fundamentals of Binaural Technology", Acoustics Laboratory, Aalborg University, Mar. 3, 1992, Aalborg, Denmark.

James R. Milne, Gregory Carlsson, Tonni Sandager Larsen, "Global HRTF Repository", file history of related U.S. Appl. No. 16/424,313, filed May 28, 2019.

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.

James R. Milne, Gregory Peter Carlsson, "Techniques Combining Plural Head-Related Transfer Function (HRTF) Spheres to Place Audio Objects", file history of related U.S. Appl. No. 16/424,983, filed May 29, 2019.

Slim Ghorbal, Renaud Seguier, Xavier Bonjour, "Process of HRTF Individualization by 3D Stastical Ear", Audio Engineering Society, Convention e-Brief 283, Presented at the 141st Convention, Sep. 29-Oct. 2, 2016, Los Angeles, CA.

Sridhar et al., "A Database of Head-Related Transfer Function and Morphological Measurements", Audio Engineering Society, Oct. 2017, New York.

Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.

Thibaut Carpentier. "Binaural synthesis with the Web Audio API". 1st Web Audio Conference (WAC), Jan. 2015, Paris, France. hal-01247528.

Milne et al., "Generating Personalized End User Room-Related Transfer Function (RRTF)", file history of related U.S. Appl. No. 16/681,632, filed Nov. 12, 2019.

YARRA 3DX: The Most Advanced 3D Audio System in the World, Jul. 2016, retrieved from https://www.kickstarter.com/projects/yarra3dx/yarra-3dx-the-most-advanced-3d-audio-system-in-the.

Mohapatra et al., "Generating Personalized End User Head-Related Transfer Function (HRTF) from Generic HRTF", related U.S. Appl. No. 16/662,995, Non-Final Office Action dated Apr. 29, 2020.

Mohapatra et al., "Generating Personalized End User Head-Related Transfer Function (HRTF) from Generic HRTF", related U.S. Appl. No. 16/662,995, Applicant's response to Non-Final Office Action filed May 5, 2020.

Milne et al., "Techniques Combining Plural Head-Related Transfer Function (HRTF) Spheres to Place Audio Objects", related U.S. Appl. No. 16/424,983, Applicant's response to Final Office Action filed Nov. 10, 2020.

(56) References Cited

OTHER PUBLICATIONS

Milne et al., "Generating Personalized End User Room-Related Transfer Function (RRTF)", related U.S. Appl. No. 16/681,632, Non-Final Office Action dated Jan. 11, 2021.
Milne et al., "Generating Personalized End User Room-Related Transfer Function (RRTF)", related U.S. Appl. No. 16/681,632, Applicant's response to Non-Final Office Action filed Jan. 29, 2021.
Mohapatra et al., "Generating Personalized End User Head-Related Transfer Function (HRTF) from Generic HRTF", related U.S. Appl. No. 16/662,995, Non-Final Office Action dated Jan. 21, 2021.
Mohapatra et al., "Generating Personalized End User Head-Related Transfer Function (HRTF) from Generic HRTF", related U.S. Appl. No. 16/662,995, Applicant's response to Non-Final Office Action filed Feb. 1, 2021.
Mohapatra et al., "Generating Personalized End User Head-Related Transfer Function (HRTF) from Generic HRTF", related U.S. Appl. No. 16/662,995, Final Office Action dated Sep. 29, 2020.
Mohapatra et al., "Generating Personalized End User Head-Related Transfer Function (HRTF) from Generic HRTF", related U.S. Appl. No. 16/662,995, Applicant's response to Final Office Action filed Oct. 27, 2020.
James R. Milne, Gregory Carlsson, Tonni Sandager Larsen, "Global HRTF Repository", related U.S. Appl. No. 16/424,313, Final Office Action dated Dec. 17, 2020.
James R. Milne, Gregory Carlsson, Tonni Sandager Larsen, "Global HRTF Repository", related U.S. Appl. No. 16/424,313, Applicant's response to Final Office Action filed Dec. 28, 2020.
Thesaurus, Deviation Synonyms, Deviation Antonyms, (Year:2011).
Farina et al., "Measuring Spatial MIMO Impulse Responses in Rooms Employing Spherical Transducer Array", AES, 2016.
Milne et al., "Techniques Combining Plural Head-Related Transfer Function (HRTF) Spheres to Place Audio Objects", related U.S. Appl. No. 16/424,983, Non-Final Office Action dated May 15, 2020.
Milne et al., "Techniques Combining Plural Head-Related Transfer Function (HRTF) Spheres to Place Audio Objects", related U.S. Appl. No. 16/424,983, Applicant's response to Non-Final Office Action filed May 27, 2020.
Milne et al., "Generating Personalized End User Head-Related Transfer Function (HRTF) from Generic HRTF", file history of related U.S. Appl. No. 16/662,995, filed Oct. 24, 2019.
James R. Milne, Gregory Carlsson, Tonni Sandager Larsen, "Global HRTF Repository", related U.S. Appl. No. 16/424,313, Non-Final Office Action dated Aug. 6, 2020.
James R. Milne, Gregory Carlsson, Tonni Sandager Larsen, "Global HRTF Repository", related U.S. Appl. No. 16/424,313, Applicant's response to Non-Final Office Action filed Sep. 17, 2020.
James R. Milne, Gregory Peter Carlsson, "Generating Personalized End User Head-Related Transfer Function (HRTF) Using Panoramic Images of Ear", related U.S. Appl. No. 16/168,317, Non-Final Office Action dated Aug. 4, 2020.
James R. Milne, Gregory Peter Carlsson, "Generating Personalized End User Head-Related Transfer Function (HRTF) Using Panoramic Images of Ear", related U.S. Appl. No. 16/168,317, Applicant's response to Non-Final Office Action dated Sep. 17, 2020.
Milne et al., "Techniques Combining Plural Head-Related Transfer Function (HRTF) Spheres to Place Audio Objects", related U.S. Appl. No. 16/424,983, Final Office Action dated Sep. 18, 2020.
Mohapatra et al., "Generating Personalized End User Head-Related Transfer Function (HRTF) from Generic HRTF", related U.S. Appl. No. 16/662,995, Non-Final Office Action dated Jul. 31, 2020.
Mohapatra et al., "Generating Personalized End User Head-Related Transfer Function (HRTF) from Generic HRTF", related U.S. Appl. No. 16/662,995, Applicant's response to Non-Final Office Action filed Sep. 15, 2020.
James R. Milne, Gregory Peter Carlsson, "Techniques Combining Plural Head-Related Transfer Function (HRTF) Spheres to Place Audio Objects", related U.S. Appl. No. 16/424,983, Final Office Action dated Sep. 7, 2021.
James R. Milne, Gregory Peter Carlsson, "Techniques Combining Plural Head-Related Transfer Function (HRTF) Spheres to Place Audio Objects", related U.S. Appl. No. 16/424,983, Applicant's response to Final Office Action filed Nov. 3, 2021.
Milne et al., "Techniques Combining Plural Head-Related Transfer Function (HRTF) Spheres to Place Audio Objects", related U.S. Appl. No. 16/424,983, Applicant's response to Non-Final Office Action filed Jul. 29, 2021.
Milne et al., "Techniques Combining Plural Head-Related Transfer Function (HRTF) Spheres to Place Audio Objects", related U.S. Appl. No. 16/424,983, Non-Final Office Action dated Jun. 11, 2021.
Zotkin et al., "Rendering Localized Spatial Audio in a Virtual Auditory Space", in IEEE Transactions on Multimedia, vol. 6, No. 4, pp. 553-564, Aug. 2004, doi: 10.1109/TMM.2004.827516 (Year: 2004).

* cited by examiner

HEAD RELATED TRANSFER FUNCTION (HRTF) AS BIOMETRIC AUTHENTICATION

FIELD

The present application relates generally to using head related transfer functions (HRTF) for biometric-based authentication.

BACKGROUND

HRTFs are derived using acoustic measurements of users to subsequently play back audio through the HRTF to improve the listening experience by tailoring the audio perceived by the user to the user's head geometry.

SUMMARY

As understood herein, a well-modeled HRTF is very personalized and can be considered as biometric data. HRTF data accordingly can be used alone for authentication or used in conjunction with other biometric data such as a retina scan or fingerprint to establish a compelling biometric lock. When used for biometric authentication, the HRTF templates can be stored on a server locally or on the Internet ("cloud") in an encrypted form for security.

Accordingly, a system includes at least one computer medium that is not a transitory signal and that in turn includes instructions executable by at least one processor to access at least one head related transfer function (HRTF) tailored to a first person, and based at least in part on the first HRTF, determine whether to authenticate the first person to access at least one computer function.

In example embodiments, the instructions can be executable to, prior to determining whether to authenticate the first person to access at least one computer function, decrypt a data structure representing the HRTF to derive the HRTF therefrom.

In non-limiting implementations the instructions are executable to, responsive to the first HRTF satisfying a test, compare at least a first non-HRTF biometric measurement of the first person with at least one stored non-HRTF biometric element. Responsive to the first non-HRTF biometric measurement matching the stored non-HRTF biometric element, the instructions can be executable to grant the first-person access to the at least one computer function. On the other hand, responsive to the first non-HRTF biometric measurement not matching the stored non-HRTF biometric element, the instructions can be executable to not grant the first-person access to the at least one computer function.

In other embodiments, the instructions are executable to, prior to determining whether to authenticate the first person to access at least one computer function using the first HRTF, compare at least a first non-HRTF biometric measurement of the first person with at least one stored non-HRTF biometric element. In these embodiments, responsive to the first non-HRTF biometric measurement not matching the stored non-HRTF biometric element, the instructions can be executable to not grant the first-person access to the at least one computer function. In contrast, responsive to the first non-HRTF biometric measurement matching the stored non-HRTF biometric element, the instructions can be executable to determine whether to authenticate the first person to access the at least one computer function using the first HRTF, and responsive to the first HRTF passing a test, the instructions can be executable to grant the first person access to the at least one computer function. In this way, access to the computer function is not granted if either the first HRTF fails to pass the test or if the non-HRTF biometric measurement fails to match the non-HRTF biometric element, and the first HRTF is not considered unless the non-HRTF biometric measurement matches the non-HRTF biometric element.

The computer function may include at least one audio playback.

The first HRTF can be input as a password to determine whether to authenticate the first person to access at least one computer function. Or, the first HRTF can be input as a measured biometric authenticator to determine whether to authenticate the first person to access at least one computer function.

In another aspect, a method includes receiving, at a computer, information representing at least a first head related transfer function (HRTF) associated with a first person. The method includes comparing the first HRTF to at least one template HRTF information, and based at least in part on the comparison, determining whether to authenticate the first person to access at least one computer function.

In example embodiments, the information representing the first HRTF includes an alpha-numeric string input to the computer. The alpha-numeric string can be input manually by a person or downloaded to the computer from at least one computer storage device. In other embodiments, the information representing the first HRTF includes a measured HRTF input from a HRTF measuring apparatus to the computer.

In some implementations, the method includes, responsive to the first HRTF matching the template HRTF information, comparing at least a first biometric measurement of the first person with at least one stored biometric element. This method may further include, responsive to the first biometric measurement matching the stored biometric element, granting the first person access to the at least one computer function, and responsive to the first biometric measurement not matching the stored biometric element, not granting the first person access to the at least one computer function.

In non-limiting examples, the method can include prior to determining whether to authenticate the first person to access at least one computer function using the first HRTF, comparing at least a first biometric measurement of the first person with at least one stored biometric element, and responsive to the first biometric measurement not matching the stored biometric element, not granting the first person access to the at least one computer function. This method may include, responsive to the first biometric measurement matching the stored biometric element, determining whether to authenticate the first person to access the at least one computer function using the first HRTF, and responsive to the first HRTF matching the template HRTF information, granting the first person access to the at least one computer function. In this way, access to the computer function is not granted if either the first HRTF fails to pass the test or if the biometric measurement fails to match the biometric element and the first HRTF is not considered unless the biometric measurement matches the biometric element.

In non-limiting examples, the method can include comparing at least a second HRTF information of the first person with at least one stored biometric element and authenticating the first person only if both the first HRTF information matches the template HRTF information and the second HRTF information matches the stored element. The first HRTF information may be associated with a first pose of the first person and the second HRTF information may be associated with a second pose of the first person.

In another aspect, an apparatus includes at least one processor operable to access at least one computer function and configured with instructions to receive first head related transfer function (HRTF) information. The processor is configured to compare the first HRTF information to template HRTF information, and responsive to the first HRTF information matching the template HRTF information, grant access to the computer function. However, responsive to the first HRTF information not matching the template HRTF information, the processor is configured to not grant access to the computer function.

The details of the present application, both as to its structure and operation, can be best understood in reference to the accompanying drawings, in which like reference numerals refer to like parts, and in which:

DETAILED DESCRIPTION

Figure 1:
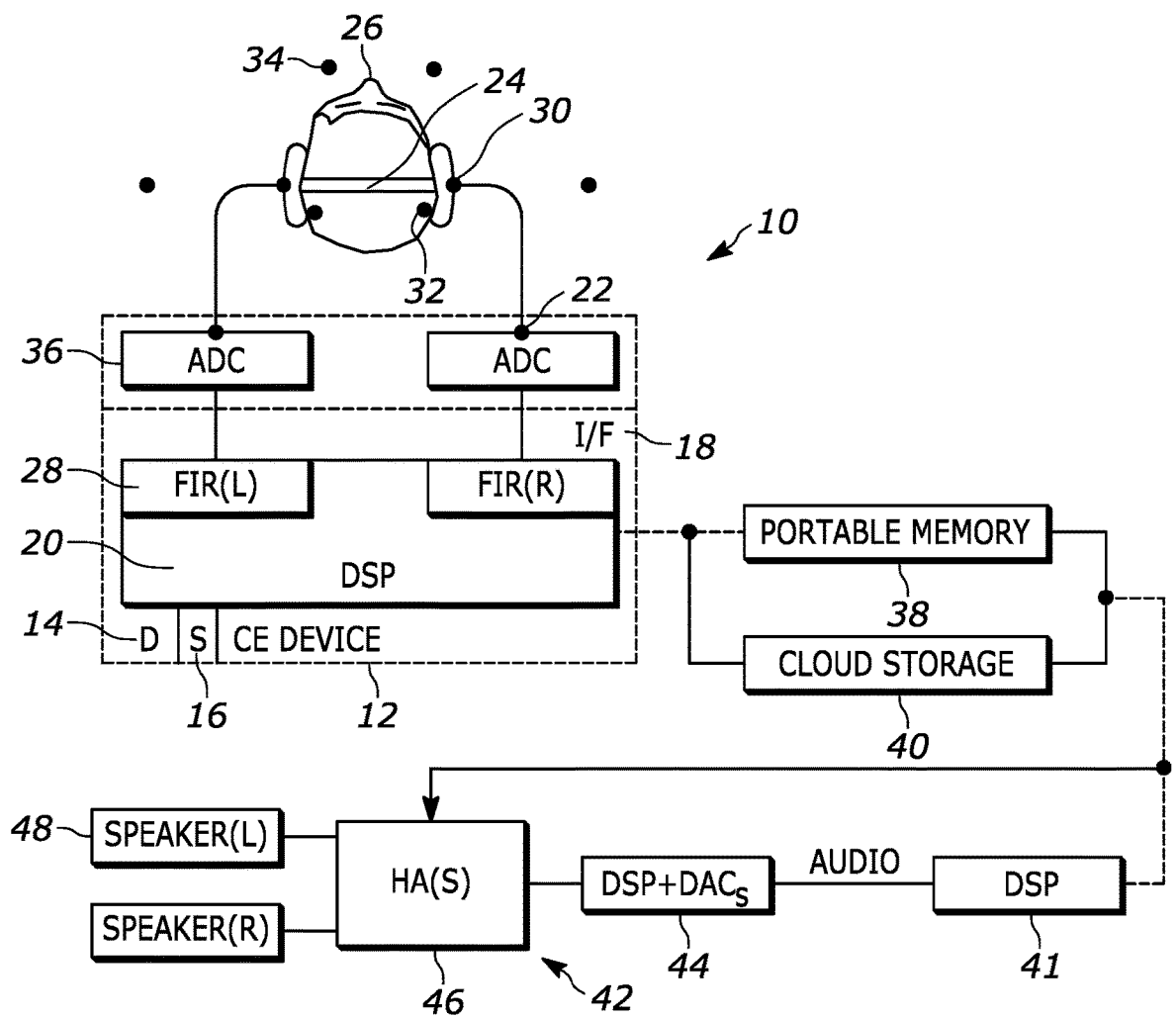
FIG. 1 is a block diagram of an example head-related transfer function (HRTF) recording and playback system.

In overview, personalized HRTFs may be stored locally or on network storage ("in the cloud") for use in authentication. U.S. patent application Ser. No. 15/822,473, owned by the present assignee and incorporated herein by reference, sets forth details of deriving personal orientation dependent HRTFs for individuals. Both the above-incorporated U.S. patent application Ser. No. 15/822,473 and U.S. patent application Ser. No. 15/402,539, also incorporated herein by reference, sets forth details of a head orientation tracking apparatus consistent with present principles.

With the above overview in mind, this disclosure accordingly relates generally to computer cosystems including aspects of computer game ecosystems. A system herein may include server and client components, connected over a network such that data may be exchanged between the client and server components. The client components may include one or more computing devices that have audio speakers including audio speaker assemblies per se such as computer game headsets and also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computer game console in combination with a display device such as an integral display or a TV. The CE device 12 may be implemented by a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include or communicate with one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-described HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described further below, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line) and/or on the DSP/amplifier module of the playback device, with the person 26 being given the portable memory 38 or access to the cloud storage 40 so as to be able to load (as indicated by the dashed line) his personalized HRTF into a receiver such as a digital signal processor (DSP) 41 of playback device 42 of the end user. A playback device may be implemented by a computer game headset and may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by applying a finite element method (FEM), finite difference method (FDM), finite volume method, and/or another numerical method, using 3D models to set boundary conditions.

Figure 2:
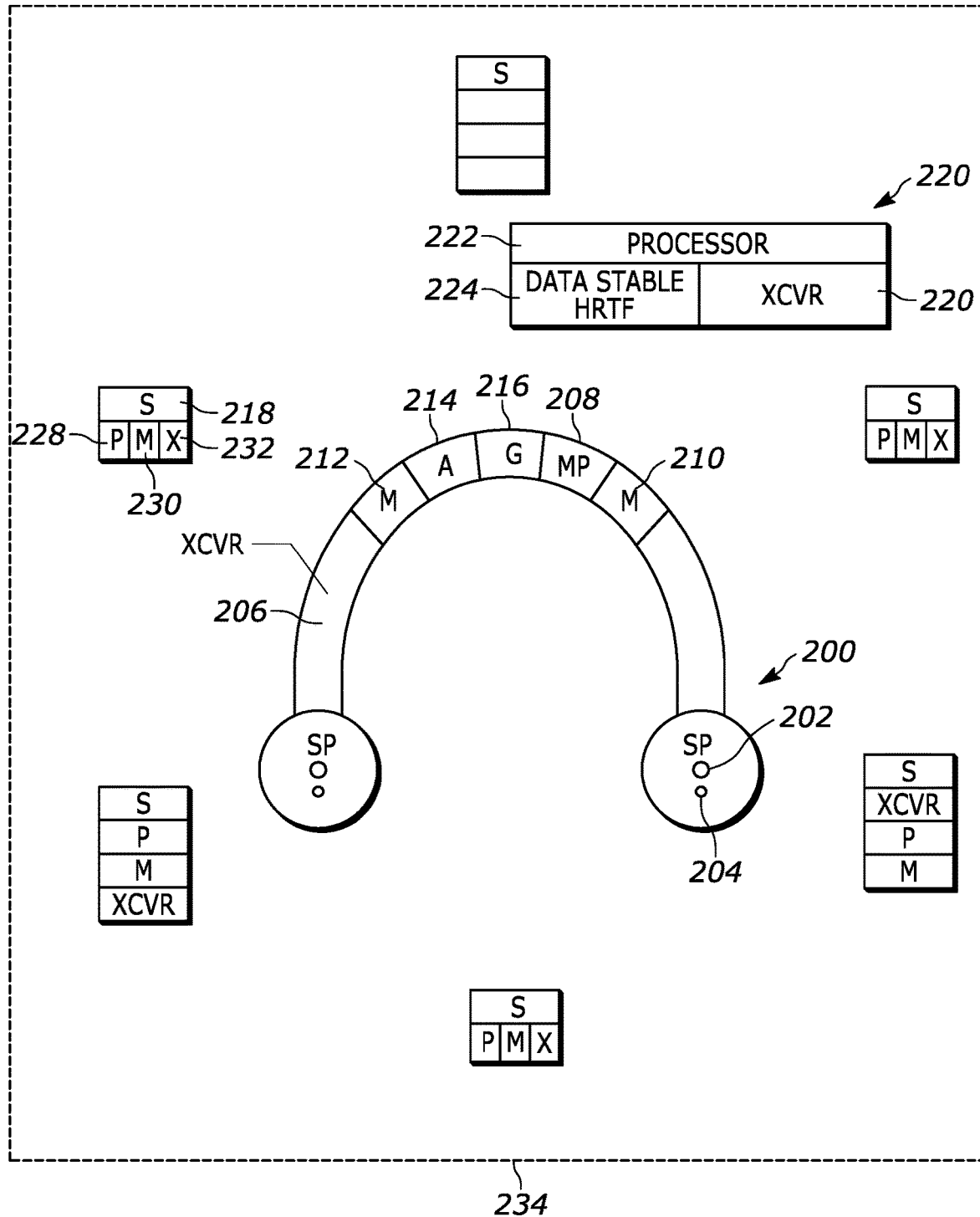
FIGS. 2 and 3 are block diagrams of example HRTF recording systems.
Figure 3:
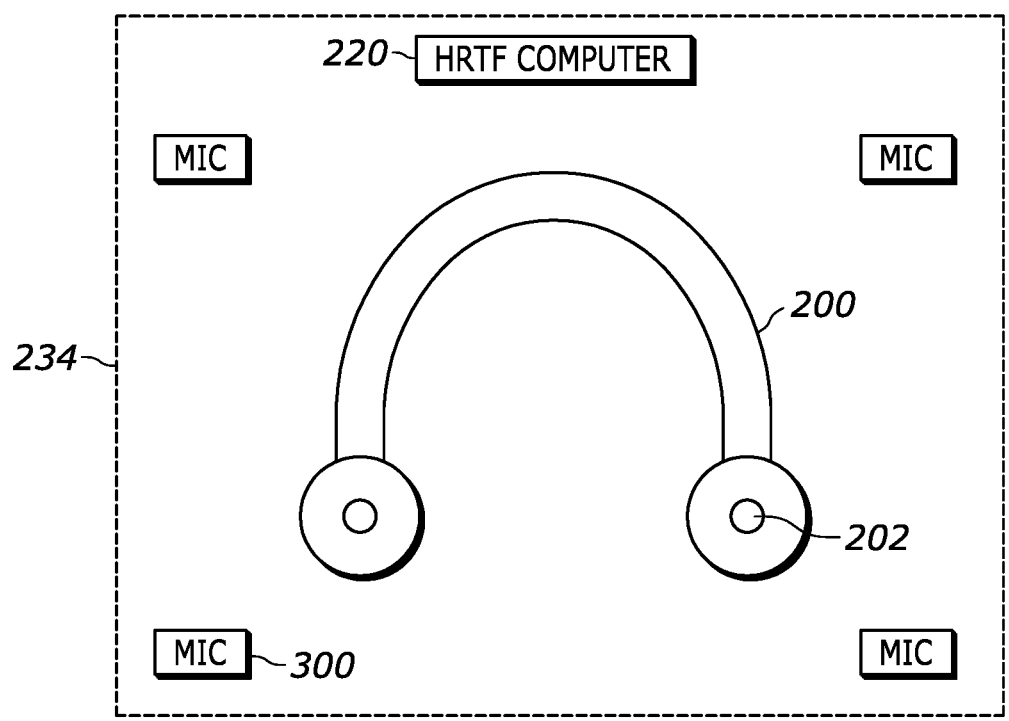

FIGS. 2 and 3 show respective HRTF file generation systems. In FIG. 2, a person (not shown) may wear headphones 200 with left and right earphone speakers 202. In lieu of or adjacent to each speaker 202 may be a respective microphone 204 for playing HRTF calibration test tones.

In the example shown, the headphones 200 may include one or more wireless transceivers 206 communicating with one or more processors 208 accessing one or more computer storage media 210. The headphones 200 may also include one or more motions sensors communicating with the processor. In the example shown, the headphones 200 include at least one magnetometer 212, at least one accelerometer 214, and at least one gyroscope 216 to establish a nine-axis motion sensor that generates signals representing orientation of the head of the wearer of the headphones 200. U.S. Pat. Nos. 9,448,405 and 9,740,305, owned by the present assignee and incorporated herein by reference, describe a nine-axis orientation measuring system in a head-mounted apparatus.

While all nine axes may be used to determine a head orientation for purposes to be shortly disclosed, in some embodiments, recognizing that sound varies the most as a person moves his head in the horizontal plane, motion in the vertical dimension (and concomitant sensor therefore) may be eliminated for simplicity.

In the example of FIG. 2, test tones from one or more speakers 218 may be played and picked up by the microphones 204, and signals from the microphones 204 may be sent via the transceiver 206 or through a wired connection to a HRTF generation computer 220, which typically includes a processor 222, computer storage 224, and communication interface 226, as well as other appropriate computers such as any described herein. Also, each speaker 218 may include a speaker processor 228 accessing speaker computer storage 230 and communicating via wired or wireless links with the computer 220 via a communication interface 232. In the example shown, test tones or other test sounds are generated by plural speakers surrounding the headphones 200 within a space 234. The space 234 may be a room of the end user's dwelling, with HRTF files being generated for each room and then the HRTF file corresponding to a room in which the end user wishes to listen to audio being selected. Or, the space 234 may be an anechoic-coated or other special sound recording room. Yet again, to generate the venue specific HRTF described below that is independent of a person and later concatenated with a person's HRTF, the space 234 may be the venue itself, e.g., Carnegie Hall, Sadler's Wells, Old Vic, the Bolshoi theater, etc. U.S. Pat. No. 8,787,584, owned by the present assignee and incorporated herein by reference, describes a method for establishing HRTF files to account for the size of a human head. U.S. Pat. No. 8,520,857, owned by the present assignee and incorporated herein by reference, describes a method for determining HRTF. This patent also describes measuring a HRTF of a space with no dummy head or human head being accounted for.

In FIG. 2, the end user wearing the headphones 200 may be asked to orient his head at a first orientation, with coefficients of a first FIR filter being determined at that orientation, and then may be asked to reorient his head at a second orientation, with coefficients of a second filter being determined at that second orientation, and so on for plural orientations. The filters together establish the HRTF file. Or, the user may be instructed to remain motionless and the speakers 218 moved to generate the first, second . . . $N^{th}$ filters. If desired, the techniques described in U.S. Pat. No. 9,118,991, owned by the present assignee and incorporated herein by reference, may be used to reduce the file size of HRTF files.

FIG. 3 illustrates an embodiment that in all essential respects is identical to that of FIG. 2, except that instead of test audio being played on external speakers and picked up on microphones in the headphones 200, test audio is played on the speakers 202 of the headphones 200 and picked up by one or more microphones 300 that are external to the headphones 200 and in communication with the HRTF computer 220.

Figure 4:
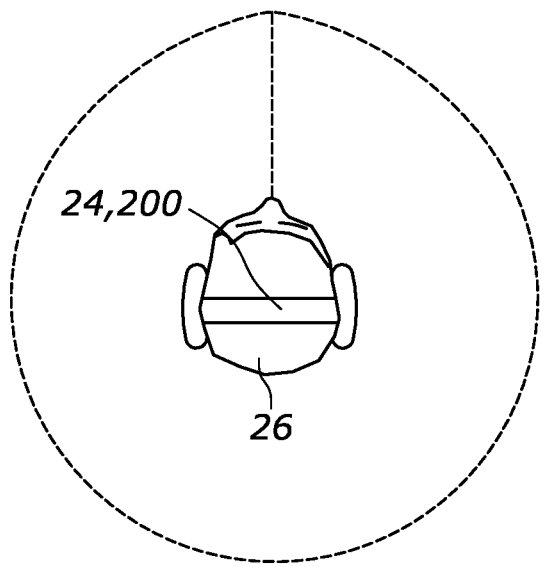
FIGS. 4 and 5 are schematic diagrams illustrating that HRTF files may be generated for plural head orientations.
Figure 5:
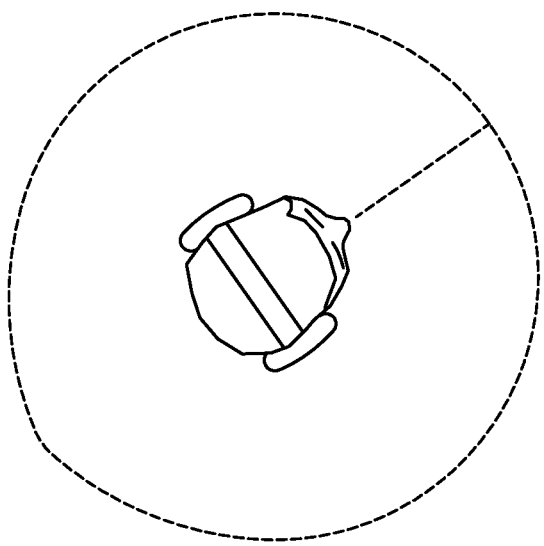

FIGS. 4 and 5 illustrate that the person 26 shown in FIG. 1 wearing the headphones 24 or 200 described previously may be instructed to orient his head in a first orientation (FIG. 4), at which a first FIR filter is generated. The first orientation may be looking straight ahead as shown. The person may then be instructed to turn his head to a second orientation (FIG. 5) at which the person is looking obliquely to straight ahead as shown, and a second FIR filter derived at the second orientation. Multiple FIR filters can be generated in this way, one for each step of orientation (e.g., one FIR filters for every two degrees of azimuth of head orientation). Note that the step of orientation may not be constant. For example, within 10 degrees of straight ahead, one filter may establish every one degree of orientation change, whereas beyond that sector, one filter may be established every three degrees of orientation.

Figure 6:
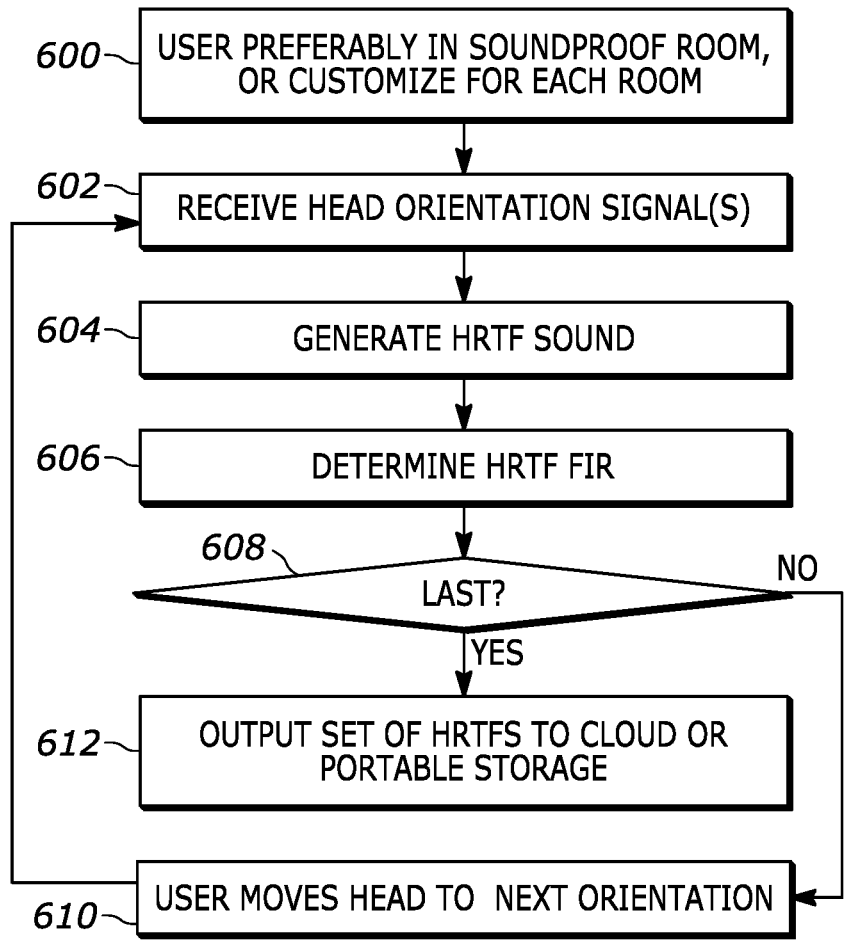
FIG. 6 is a flow chart of example HRTF recording and use logic consistent with present principles.

FIG. 6 illustrates the HRTF generation logic described above. At block 600 the user for whom the HRTF files are being personalized may be located in a soundproof room, or in a room of the user's dwelling. Proceeding to block 602, signals from the headphones indicating the orientation of the person's head are received and at that orientation HRTF test sound is generated at block 604. Based on signals from the microphones that capture the test sound, at block 606 a FIR filter is generated for the head orientation at block 602 and associated therewith in storage. If the last desired orientation to derive a FIR filter is determined to have been measured at decision diamond 608, the HRTF file (with multiple FIR filters and corresponding head orientations) is output at block 612 consistent with principles above. Otherwise, the next orientation is established at block 610 and the process loops back to block 602.

Figure 7:
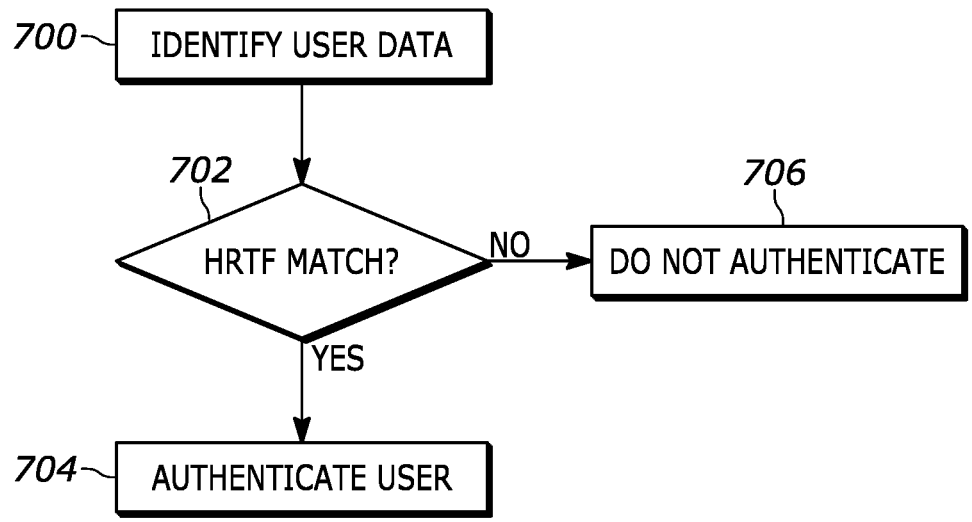
FIG. 7 is a flow chart of example overall logic consistent with present principles.

Refer now to FIG. 7 for understanding of using HRTF information as a biometric-based factor for authentication to access computer functions. Preset principles understand that a HRTF is a series of filter coefficients for each ear, with the number of coefficients being relatively large and moreover unique to the person from whom the HRTF is derived or measured. Once a person's HRTF has been derived as described above or by other appropriate means (e.g., geometrically), it may be used either as a password to gain authentication or as a biometric authenticator.

Commencing at block 700, a user is identified using user data such as, for example, a username. The user ID is correlated to pre-stored template HRTF information. At decision diamond 702 it is determined whether the user's HRTF information input at the point of authentication matches the user's template HRTF information, typically provided by the user previously during an account set-up process. If the HRTF information input at the point of authentication matches the template HRTF, the user is authenticated at block 704; otherwise, authentication is denied at block 706. An example computer function to which access is granted upon successful HRTF authentication may be audio playback using the user's HRTF as a filter to personalize the playback for the user.

It is to be understood that a "match" can be determined to have been achieved if the HRTF information input at the point of authentication matches the user's template HRTF information within a threshold error tolerance, which may range from zero to a relatively small deviation depending on the preferences of the account administrator.

When the user's HRTF is used as a biometric-based password, in FIG. 7 a string of alpha-numeric or numeric characters from a person's HRTF (essentially, the filter coefficients of the HRTF) is entered as a password and compared at decision diamond 702 to the user's previously stored template HRTF information, typically a string of filter coefficients. The user may enter the HRTF string manually for comparison at decision diamond 702 with the template HRTF information that was previously provided during account set up. Or, the user may engage a thumb drive containing the HRTF information with a computer to cause the HRTF information to be transferred from the thumb drive to the computer for comparison at decision diamond 702 with the template HRTF information that was previously provided during account set up. Yet again, the HRTF information may be accessed from cloud storage for comparison at decision diamond 702 with the template HRTF information that was previously provided during account set up. In the latter two cases the HRTF typically is encrypted and the template HRTF also is encrypted for security, such that the authenticating computer performs decryption prior to comparison at decision diamond 702.

On the other hand, when the user's HRTF is used as a biometric authenticator, a HRTF at the point of authentication is re-generated as described above or geometrically by a measuring apparatus and input directly to the authenticating computer for comparison with the template HRTF information at decision diamond 702.

Figure 8:
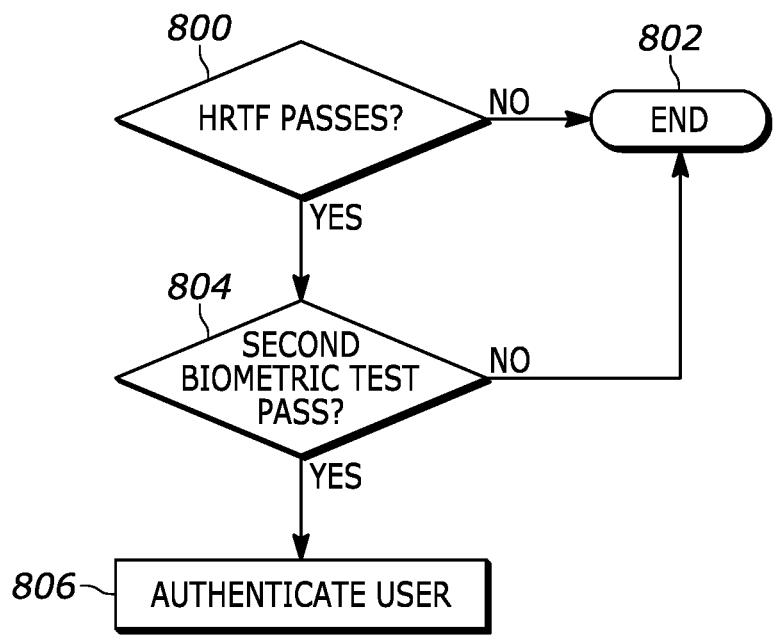
FIG. 8 is a flow chart of a first example of two-factor biometric authentication logic consistent with present principles.
Figure 9:
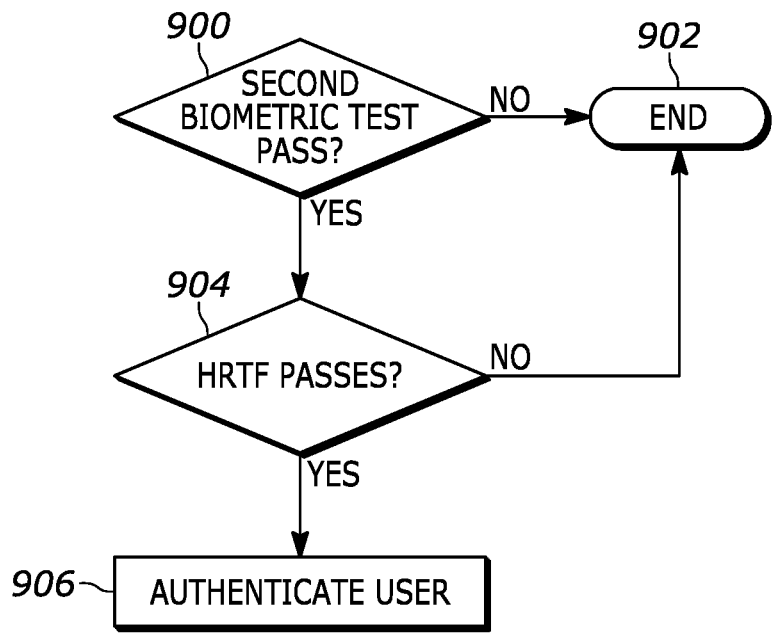
FIG. 9 is a flow chart of a second example of two-factor biometric authentication logic consistent with present principles.

FIG. 7 illustrates for simplicity that the HRTF may be the only factor used for authentication. FIGS. 8 and 9 illustrate logic in which a second factor in addition to HRTF is used to confirm authentication, after an authentication test is performed using HRTF (FIG. 8) or before HRTF is evaluated (FIG. 9). The second factor may be, for example, a retinal scan or fingerprint scan. Or, understanding that a person's HRTF may change depending on the room, and/or pose, and/or other factors in which the HRTF is measured, a person may be correlated to two or more HRTFs, with the second factor in FIGS. 8 and 9 being a second HRTF (meaning that two different HRTFs for the same person are used each associated with, for instance, a respective room or pose at which the HRTF was measured). Combinations of any or all of the above may be used.

Assuming that a user ID has been input and correlated to previously stored authentication information as described above in reference to FIG. 7, commencing at decision diamond 800 in FIG. 8, it is determined whether the HRTF input to the computer as a password or as a biometric authenticator (i.e., measured at the point of authentication) passes a test, e.g., matches a previously stored template HRTF information. If not, the logic ends at state 802. If the test is passed, however, the logic moves to decision diamond 804 to determine whether a second authentication test passes, such as whether a fingerprint scan or retinal scan or second HRTF input at the point of authentication matches stored information such as a template. Only if both the HRTF passes at decision diamond 800 and the second authentication passes at decision diamond 804 is the user authenticated at block 806.

Turning to FIG. 9 and assuming that a user ID has been input and correlated to previously stored authentication information as described above in reference to FIG. 7, commencing at decision diamond 900 it is determined whether a second authentication test passes, such as whether a finger print scan or retinal scan or second HRTF input at the point of authentication matches stored information such as a template. If not, the process ends at state 902. However, if the second authentication test passes at decision diamond 900, the logic flows to decision diamond 904 to determine whether HRTF information input to the computer as a password or as a biometric authenticator (i.e., measured at the point of authentication) passes a test, e.g., matches a previously stored template HRTF information. Only if both the second authentication passes at decision diamond 900 and the HRTF passes at decision diamond 904 is the user authenticated at block 906. In this way, access to the computer function is not granted if either the first HRTF fails to pass the test or if the second biometric measurement fails to pass the test. Moreover, the first HRTF need not be requested for input at all (thus avoiding re-measuring the HRTF or inputting the string representing the filter coefficients of the HRTF) unless the second biometric measurement first passes the test.

Figure 10:
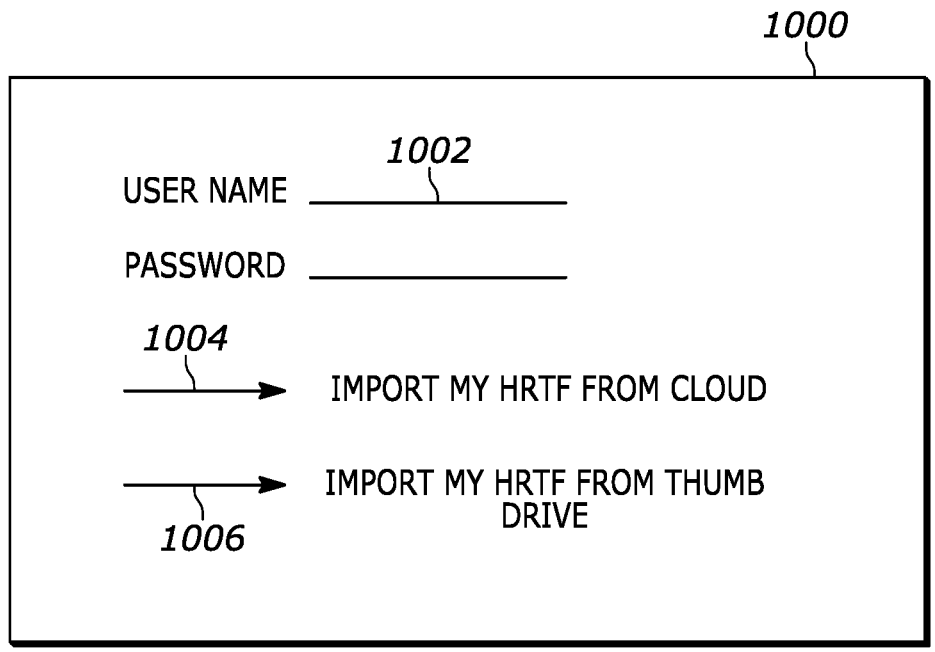
FIG. 10 is a screen shot of an example user interface consistent with present principles.

FIG. 10 illustrates a user interface (UI) 1000 that may be used to input a username into a field 1002 to satisfy block 700 in FIG. 7. The UI 1000 may also include a selector 1004 that a user can select to cause the computer to import, as a password, a stored HRTF from the "cloud". Furthermore, a selector 1006 may be provided to cause the computer to import, as a password, a stored HRTF from a portable drive the user inserts into a port of the computer.

While the particular embodiments are herein shown and described in detail, it is to be understood that the subject matter which is encompassed by the present invention is limited only by the claims.

What is claimed is:

1. A system comprising:
    at least one computer medium that is not a transitory signal and that comprises instructions executable by at least one processor to:
    compare at least a first head related transfer function (HRTF) of a first person with at least a first stored value;
    compare at least a second HRTF information of the first person with at least one stored element; and
    authenticate the first person only if both the first HRTF information matches the first stored value and the second HRTF information matches the stored element.

2. The system of claim 1, comprising the at least one processor.

3. The system of claim 1, wherein the instructions are executable to:
    prior to determining whether to authenticate the first person to access at least one computer function, decrypt a data structure representing the HRTF to derive the HRTF therefrom.

4. The system of claim 1, wherein the first HRTF information is associated with a first pose of the first person and the second HRTF information is associated with a second pose of the first person.

5. An apparatus comprising:
    at least one computer medium that is not a transitory signal and that comprises instructions executable by at least one processor to:
    access at least a first head related transfer function (HRTF) tailored to a first person;
    compare at least a first non-HRTF biometric measurement of the first person with at least one stored non-HRTF biometric element;
    responsive to the first non-HRTF biometric measurement not matching the stored non-HRTF biometric element, not grant the first-person access to the at least one computer function;
    responsive to the first non-HRTF biometric measurement matching the stored non-HRTF biometric element, determine whether to authenticate the first person to access the at least one computer function using the first HRTF; and
    responsive to the first HRTF passing a test, grant the first person access to the at least one computer function, such that access to the at least one computer function is not granted if either the first HRTF fails to pass the test or if the non-HRTF biometric measurement fails to match the non-HRTF biometric element and such that the first HRTF is not considered unless the non-HRTF biometric measurement matches the non-HRTF biometric element.

6. The system of claim 1, wherein the computer function comprises at least one audio playback.

7. The system of claim 1, wherein the first HRTF is input as a password to determine whether to authenticate the first person to access at least one computer function.

8. The system of claim 1, wherein the first HRTF is input as a measured biometric authenticator to determine whether to authenticate the first person to access at least one computer function.

9. A method comprising:
comparing at least a first biometric measurement of a first person with at least one stored biometric element, the first biometric measurement not being based on a head-related transfer function (HRTF) of the first person;
responsive to the first biometric measurement not matching the stored biometric element, not granting the first-person access to the at least one computer function;
responsive to the first biometric measurement matching the stored biometric element, determining whether to authenticate the first person to access the at least one computer function using a first HRTF of the first person; and
responsive to the first HRTF matching the template HRTF information, granting the first person access to the at least one computer function, such that access to the at least one computer function is not granted if either the first HRTF fails to pass the test or if the biometric measurement fails to match the biometric element and such that the first HRTF is not considered unless the biometric measurement matches the biometric element.

10. The method of claim 9, wherein the information representing the first HRTF comprises an alpha-numeric string input to the computer.

11. The method of claim 10, wherein the alpha-numeric string is input manually by a person.

12. The method of claim 10, wherein the alpha-numeric string is downloaded to the computer from at least one computer storage device.

13. The method of claim 9, wherein the information representing the first HRTF comprises a measured HRTF input from a HRTF measuring apparatus to the computer.

14. The method of claim 9, wherein the HRTF comprises at least one signal filter.

15. A computer-implemented method, comprising:
comparing at least a first head related transfer function (HRTF) of a first person with at least a first stored value;
comparing at least a second HRTF information of the first person with at least one stored element; and
authenticating the first person only if both the first HRTF information matches the first stored value and the second HRTF information matches the stored element.

16. The method of claim 15, wherein the first HRTF information is associated with a first pose of the first person and the second HRTF information is associated with a second pose of the first person.

17. An apparatus comprising:
at least one processor implemented by hardware and operable to access at least one computer function and configured with instructions to:
compare at least a first non-head-related transfer function (HRTF) biometric measurement of a first person with at least one stored non-HRTF biometric element;
responsive to the first non-HRTF biometric measurement not matching the stored non-HRTF biometric element, not grant the first-person access to the at least one computer function;
responsive to the first non-HRTF biometric measurement matching the stored non-HRTF biometric element, determine whether to authenticate the first person to access the at least one computer function using a first HRTF; and
responsive to the first HRTF passing a test, grant the first person access to the at least one computer function, such that the first HRTF is not considered unless the first non-HRTF biometric measurement matches the non-HRTF biometric element.

18. The apparatus of claim 17, wherein the first HRTF information is received from a user-manipulable input device.

19. The apparatus of claim 17, wherein the first HRTF information is received from a computer storage device.

* * * * *